(12) United States Patent
Um et al.

(10) Patent No.: US 12,531,106 B2
(45) Date of Patent: Jan. 20, 2026

(54) MEMORY MODULE ADJUSTING INTER-RANK CLOCK TIMING, MEMORY SYSTEM AND TRAINING METHOD THEREOF

(71) Applicant: SAMSUNG ELECTRONICS CO., LTD., Suwon-si (KR)

(72) Inventors: Youngdo Um, Suwon-si (KR); Hoseok Seol, Suwon-si (KR); Taeyoung Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 201 days.

(21) Appl. No.: 18/218,931

(22) Filed: Jul. 6, 2023

(65) Prior Publication Data

US 2024/0046975 A1  Feb. 8, 2024

(30) Foreign Application Priority Data

Aug. 3, 2022 (KR) .................. 10-2022-0096974
Dec. 20, 2022 (KR) .................. 10-2022-0179370

(51) Int. Cl.
| | |
|---|---|
| *G06F 13/42* | (2006.01) |
| *G11C 11/4076* | (2006.01) |
| *G11C 11/408* | (2006.01) |
| *H03K 5/14* | (2014.01) |
| *H01L 25/18* | (2023.01) |
| *H03K 5/00* | (2006.01) |

(52) U.S. Cl.
CPC ...... *G11C 11/4076* (2013.01); *G06F 13/4282* (2013.01); *G11C 11/408* (2013.01); *H03K 5/14* (2013.01); *H01L 25/18* (2013.01); *H03K 2005/00019* (2013.01)

(58) Field of Classification Search
None
See application file for complete search history.

(56) References Cited

U.S. PATENT DOCUMENTS

| | | |
|---|---|---|
| 7,127,584 B1 | 10/2006 | Thompson et al. |
| 9,026,725 B2 | 5/2015 | Kostinsky et al. |
| 10,360,959 B2 | 7/2019 | Wilmoth et al. |
| 10,621,121 B2 | 4/2020 | Lovelace et al. |
| 10,650,872 B2 | 5/2020 | Ware et al. |

(Continued)

FOREIGN PATENT DOCUMENTS

WO   2022132538 A1   6/2022

OTHER PUBLICATIONS

Communication dated Dec. 1, 2023, issued by European Patent Office in European Patent Application No. 23188849.6.

(Continued)

*Primary Examiner* — Henry Tsai
*Assistant Examiner* — Dean Phan
(74) *Attorney, Agent, or Firm* — Sughrue Mion, PLLC

(57) ABSTRACT

There is provided a memory module including a first memory device constituting a first rank, and a second memory device constituting a second rank sharing a command/address signal and a clock signal with the first memory device. The first memory device and the second memory device receive the command/address signal and the clock signal in a matched type, and the first memory device includes a variable delay line for adjusting a delay of the received clock signal.

20 Claims, 12 Drawing Sheets

(56) References Cited

U.S. PATENT DOCUMENTS

| | | |
|---|---|---|
| 10,733,119 B2 | 8/2020 | Yun et al. |
| 11,003,370 B2 | 5/2021 | Kim et al. |
| 2008/0054965 A1* | 3/2008 | Arai .................. G11C 7/22 |
| | | 327/158 |
| 2014/0269121 A1* | 9/2014 | Takahashi ............ G11C 7/1039 |
| | | 365/194 |
| 2020/0110716 A1* | 4/2020 | Mozak ................ G06F 9/30029 |
| 2021/0151087 A1 | 5/2021 | Ito et al. |
| 2022/0101908 A1 | 3/2022 | Ware |
| 2022/0222189 A1 | 7/2022 | Ware et al. |
| 2024/0055068 A1* | 2/2024 | Bamdhamravuri .... G11C 7/222 |

OTHER PUBLICATIONS

Communication dated Sep. 11, 2025, issued by the European Patent Office in counterpart European Application No. 23188849.6.

* cited by examiner

MEMORY MODULE ADJUSTING INTER-RANK CLOCK TIMING, MEMORY SYSTEM AND TRAINING METHOD THEREOF

CROSS-REFERENCE TO RELATED APPLICATIONS

This application is based on and claims priority under 35 U.S.C. § 119 to Korean Patent Application No. 10-2022-0096974 filed on Aug. 3, 2022, and to Korean Patent Application No. 10-2022-0179370 filed on Dec. 20, 2022, in the Korean Intellectual Property Office, the disclosures of which are incorporated by reference herein in their entireties.

BACKGROUND

1. Field

Embodiments of the disclosure relate to a semiconductor memory device, and more particularly, to a memory module for adjusting inter-rank timing, a memory system including the memory module, and a method for adjusting the inter-rank timing.

2. Description of Related Art

Recently, various electronic devices such as smart phones, desktop computers, laptop computers, tablet PCs, wearable devices and mobile devices are widely used. These electronic devices usually include semiconductor memory devices for storing data. As an example of a semiconductor memory device, a dynamic random access memory (DRAM) device, which is a volatile-memory, stores data by charge stored in a capacitor.

In general, a memory module provided as a low-power mobile memory may be divided into two or more ranks. That is, in the case of a dual rank structure, a plurality of semiconductor memory devices mounted on a substrate of a memory module may be arranged into two ranks, and semiconductor memory devices belonging to the same rank can be simultaneously accessed. A rank may refer to a unit in which a memory controller inputs data to semiconductor memory devices and/or outputs data from semiconductor memory devices. If a single rank has, for example, a 64-bit data transmission width, a dual rank may have a data transmission width twice that of the single rank. However, a dual rank may be also configured such that it has the same width as a single rank.

With the trend of high capacity and high speed, signal integrity (SI) characteristics of command/address (hereinafter, CA) input at high speed have deteriorated. In particular, in a multi-rank system, achieving signal integrity SI is becoming increasingly difficult due to distribution of characteristics between ranks. In order to overcome this, the timing of the command/address CA clock for each rank can be individually controlled in the memory controller, but this reduces performance and burdens related components.

SUMMARY

Embodiments of the disclosure provide a matched type multi-rank memory module, a memory system, and a training method capable of compensating for clock skew between ranks.

According to an aspect of the disclosure, there is provided a memory module, including: a first memory device including a first rank; and a second memory device v a second rank, the second memory device configured to share a command/address (CA) signal and a clock signal with the first memory device, wherein the first memory device and the second memory device receive the CA signal and the clock signal in a matched manner, and the first memory device comprises a variable adjustment circuit configured to adjust a characteristic of the received clock signal.

The clock signal corresponds to a strobe signal for latching the CA signal.

The first memory device may include: a CA adjustment circuit configured to adjust a characteristic of the CA signal based on a first value; the variable adjustment circuit configured to adjust the characteristic of the clock signal based on a second value; and a flip-flop configured to latch the CA signal output from the first circuit based on the adjusted clock signal.

The first memory device may include a delay control logic configured to adjust the variable adjustment circuit.

The delay control logic may be controlled through a mode register set command provided from outside of the first memory device.

The delay control logic may include a fuse offset configured to set the variable delay logic to the second value according to an external control of the first memory device.

The second value may be determined through command bus training for the first memory device and the second memory device.

According to another aspect of the disclosure, there is provided a training method for a matched type multi-rank memory module sharing a command/address (CA) signal and a clock signal, the method including: performing first command bus training to check alignment of the CA signal and the clock signal in a first rank; performing second command bus training to check alignment of the CA signal and the clock signal in a second rank; checking, based on results of the first command bus training and the second command bus training, a first margin of the CA in the first rank and a second margin of the CA in the second rank; and adjusting a delay of the clock signal within the first rank based on the first margin of the CA in the first rank or the second rank based on the second margin of the CA in the second rank.

The first rank or the second rank may include a variable delay line for adjusting the delay of the clock signal.

The method may include adjusting the variable delay line through a mode register set command or a fuse program.

The clock signal may correspond to a strobe signal for latching the command/address signal.

According to another aspect of the disclosure, there is provided a memory system including: a memory controller configured to transmit a first signal through a first bus and a clock signal through a second bus; and a memory module comprising a first rank memory and a second rank memory, the first rank memory and the second rank memory configured to share the first bus and the second bus, wherein the first rank memory or the second rank memory comprises a variable adjustment circuit configured to variably adjust a characteristic of the clock signal received through the second bus.

The first rank memory or the second rank memory may receive the first signal and the clock signal in a matched manner.

The first signal transmitted through the first bus may correspond to a command/address (CA) signal.

The first signal transmitted through the first bus may correspond to a data (DQ) signal.

The first rank memory may include: a fixed adjustment circuit configured to adjust the characteristic of the first signal based on a first value; the variable adjustment circuit configured to variably adjust the characteristic of the clock signal based on a second value; and a flip-flop circuit configured to latch the first signal output from the fixed adjustment circuit based on the adjusted clock signal output from the variable adjustment circuit.

The first rank memory may include a delay control logic configured to set the second value based on a control signal.

The delay control logic may include a mode register set or a fuse option.

The memory controller may be further configured to perform command bus training to detect skew of the first bus of the first rank memory and the second rank memory.

The memory controller may be further configured to set a delay size of the variable adjustment circuit of one of the first rank memory and the second rank memory based on a result of the command bus training.

BRIEF DESCRIPTION OF DRAWINGS

The above and other objects and features of the disclosure will become apparent by describing in detail embodiments thereof with reference to the accompanying drawings.

DETAILED DESCRIPTION

It is to be understood that both the foregoing general description and the following detailed description are exemplary, and it is to be considered that an additional description of the claimed invention is provided. Reference signs are indicated in detail in embodiments of the disclosure, examples of which are indicated in the reference drawings. Wherever possible, the same reference numbers are used in the description and drawings to refer to the same or like parts.

Hereinafter, DRAM will be used as an example of a semiconductor memory device for explaining the features and functions of the disclosure. However, those skilled in the art will readily appreciate other advantages and capabilities of the example embodiments in light of the disclosure herein. For example, example embodiment of the disclosure may be implemented with other type of memory devices. The disclosure may be implemented or applied through other embodiments. In addition, the detailed description may be modified or changed according to viewpoints and applications without significantly departing from the scope, spirit, and other objectives of the example embodiment of the disclosure.

Figure 1:
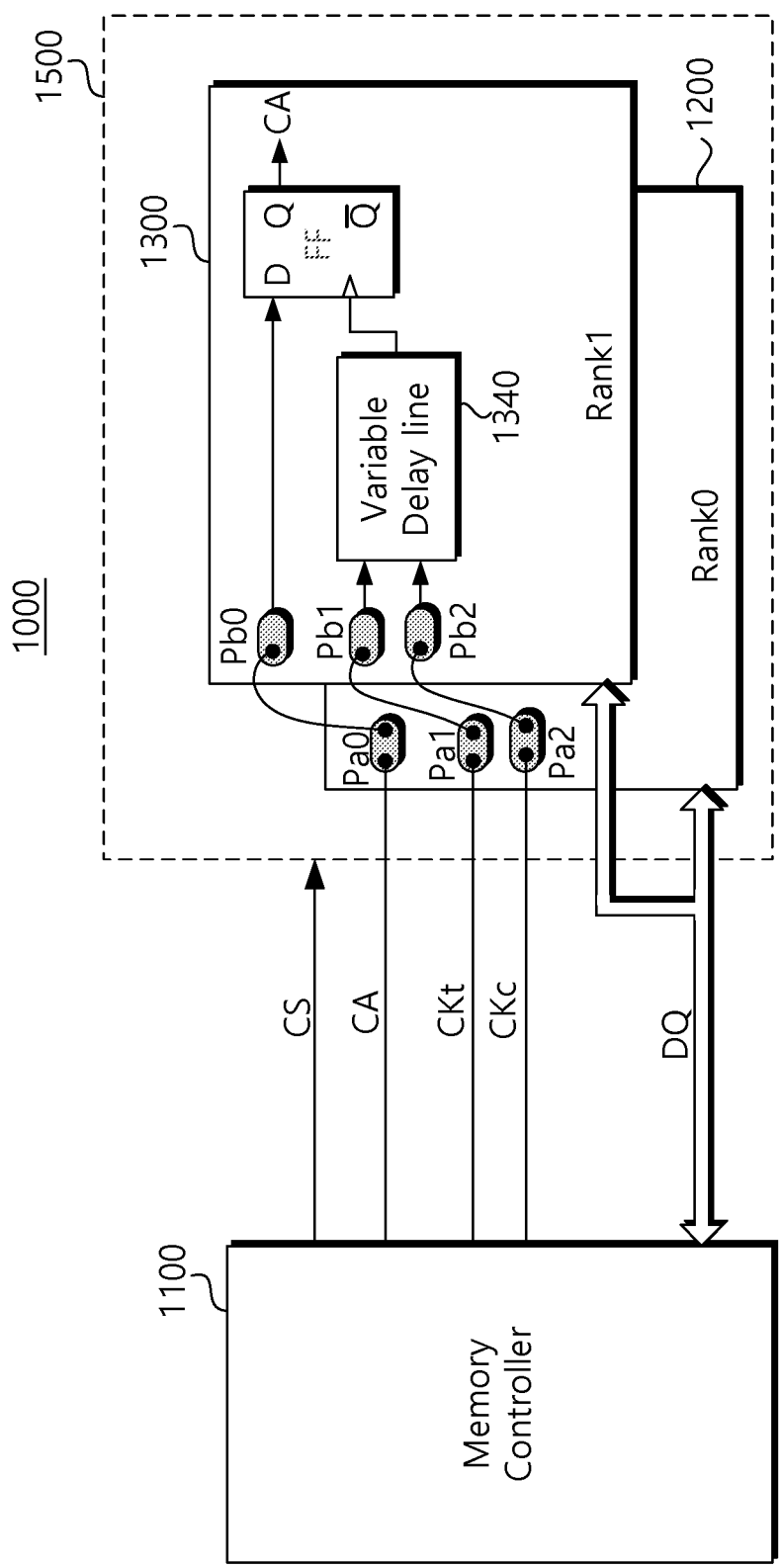
FIG. 1 is a block diagram briefly showing the structure of a memory system according to an exemplary embodiment.

FIG. 1 is a block diagram briefly showing the structure of a memory system according to an exemplary embodiment. Referring to FIG. 1, a memory system 1000 includes a memory controller 1100 and a memory module 1500. The memory module 1500 includes memory devices 1200 and 1300 constituting two ranks.

The memory controller 1100 may perform operations for accessing data in the memory module 1500. For example the access operations may include an operation of writing data to the memory module 1500 or an operation of reading data stored in the memory module 1500. The memory controller 1100 may generate a command CMD and an address ADDR for writing data into the memory module 1500 or reading data stored in the memory module 1500. The memory controller 1100 may be at least one of a chipset for controlling the memory module 1500, a system-on-a-chip SoC such as a mobile application processor AP, a CPU, and a GPU. However, the disclosure is not limited thereto, and as such, according to another embodiment, the memory controller 1100 may be implemented in another manner.

The memory module 1500 includes memory devices 1200 and 1300 corresponding to the multi-ranks Rank0 and Rank1, respectively. That is, the memory device 1200 may constitute the first rank Rank0, and the memory device 1300 may constitute the second rank Rank1. A memory rank refers to a plurality of memory devices or memory chips that receive and respond to a common command/address CA from the memory controller 1100.

Memory devices of each rank generally share at least one of a data bus (DQ), a command/address (CA) bus, and clock signals (CKt, CKc) used as a strobe signal of the command/address (CA). In an embodiment, the memory devices 1200 and 1300 each share a command/address CA bus and clock signals CKt and CKc, and a data bus DQ uses a chip select signal (Chip Select: hereinafter, referred to as CS).

According to an embodiment, the first memory device 1200 constitutes a first rank Rank0, and the second memory device 1300 constitutes a second rank Rank1. In other words, the first rank Rank0 may include the first memory device 1200 and the second rank Rank1 may include the second memory device 1300. However, the disclosure is not limited thereto, and as such, according to another embodiment, the number of ranks and the number of memory devices may be different than two. For example, the first rank Rank0 and the second rank Rank1 may each include 4 or 8 semiconductor memory devices. For convenience of description hereinafter, the first rank Rank0 includes the first memory device 1200 and the second rank Rank1 includes the second memory device 1300, and the first rank Rank0 and the second rank Rank1 may be used interchangeably with the first memory device 1200 and the second memory device 1300, respectively. According to an embodiment, in order to configure a multi-rank, a command/address CA signal is transmitted through at least one pad Pa0 of the first memory device 1200. The same command/address CA signal is connected to at least one pad Pb0 of the second memory device 1300 via the pad Pa0 of the first memory device 1200. The command/address signal CA is electrically connected in parallel to the respective pads Pa0 and Pb0 of the memory devices 1200 and 1300. However, as the memory devices 1200 and 1300 are physically connected through wire bonding, signal transfer characteristics may vary. Although one pad Pa0 and one pad Pb0 are shown, it will be well understood that there may be two or more pads depending on the bit width of the command/address signal CA. Reception of the command/address signal CA and the clock signals CKt and CKc of each of the memory devices 1200 and 1300 is provided in a matched type structure. That is, paths of the command/address signal CA and the clock signals CKt and CKc of each of the memory devices 1200 and 1300 are provided with the same delay size.

Clock signals CKt and CKc may be transmitted to the first memory device 1200 through pads Pa1 and Pa2. For example, clock signals CKt and CKc are transmitted in the form of differential signals to the first memory device 1200 through pads Pa1 and Pa2. The clock signals CKt and CKc may be used as strobe signals of the command/address signal CA. Also, the clock signals CKt and CKc may be transmitted to the pads Pb1 and Pb2 of the second memory device 1300 via the pads Pa1 and Pa2 of the first memory device 1200. The clock signals CKt and CKc are also transmitted in parallel to the respective pads Pa1, Pa2, Pb1, and Pb2 of the memory devices 1200 and 1300. However, transfer characteristics of the clock signals CKt and CKc of the first memory device 1200 and the second memory device 1300 may vary depending on the physical wire connection. For example, frequencies of the clock signals CKt and CKc may vary depending on the length of the physical wire connection between pads of the first semiconductor device and pads of the second semiconductor device.

According to an embodiment, a memory device (e.g., 1300) may include a controllable variable delay line 1340. The memory controller 1100 performs command bus training (hereinafter referred to as CBT) for each of the ranks. The memory controller 1100 adjusts the variable delay line 1340 of one rank (e.g., Rank1) according to the command bus training CBT result to set each of the two ranks to operate at optimal clock timing. That is, when there is a skew in the command/address signals CA received from the first memory device 1200 and the second memory device 1300, the variable delay line 1340 of the second memory device 1300 can be adjusted to compensate for the skew. Through such training, each of the ranks may receive the command/address signal CA at optimal clock timing.

To detect whether the clock signals CKt and CKc are aligned with the command/address signal CA, the memory system 1000 may support a command bus training CBT mode. That is, the memory controller 1100 may perform bus training on a command bus when power is supplied to the memory module 1500 or during an initialization operation. The memory controller 1100 may perform command bus training CBT on each of the ranks Rank0 and Rank1 to check the margins of the command/address signals CA, respectively. The skew may be compensated for by adjusting the variable delay line 1340 of any one of the ranks Rank0 and Rank1 based on the margin of the command/address signal CA.

The memory system 1000 may be implemented in a personal computer PC or mobile device. Mobile devices include laptop computers, mobile phones, smart phones, tablet PCs, personal digital assistants (PDAs), enterprise digital assistants (EDAs), digital still cameras, digital video cameras, and portable multimedia player (PMPs), PND (Personal Navigation Device or Portable Navigation Device), handheld game console, mobile internet device (MID), wearable computer, Internet of Things (IoT) device, Internet of Everything (IoE) devices, or drones.

Each of the memory devices 1200 and 1300 may include a memory cell array including a plurality of memory cells. In one embodiment, the memory cell may be a volatile memory cell, and each of the memory devices 1200 and 1300 includes, but is not limited to, dynamic random access memory (DRAM), static random access memory (SRAM), mobile DRAM, and DDR SDRAM (Double Data Rate Synchronous Dynamic Random Access Memory), LPDDR (Low Power DDR) SDRAM, GDDR (Graphic DDR) SDRAM, RDRAM (Rambus Dynamic Random Access Memory), and the like.

In another embodiment, the memory cell may be a non-volatile memory cell, and each of the memory devices 1200 and 1300 may include a non-volatile memory such as an Electrically Erasable Programmable Read-Only Memory (EEPROM), a flash memory, PRAM (Phase Change Random Access Memory), RRAM (Resistance Random Access Memory), NFGM (Nano Floating Gate Memory), PoRAM (Polymer Random Access Memory), MRAM (Magnetic Random Access Memory), FRAM (Ferroelectric Random Access Memory) Access Memory) and the like. Hereinafter, each of the memory devices 1200 and 1300 is described as a DRAM, but it will be well understood that the technical spirit of the present disclosure is not limited thereto.

As described above, the memory system 1000 may include the memory module 1500 having a multi-rank structure. Also, the memory module 1500 receives the command/address signal CA and the clock signals CKt and CKc in a matched manner. The memory controller 1100 checks the skew of the command/address signal CA and the clock signals CKt and CKc, which are commonly used for each of the ranks, through command bus training CBT. In addition, at least one variable delay line of the memory devices 1200 and 1300 may be adjusted to compensate for the checked skew. Through this, the command/address signal CA and the clock signals CKt and CKc can be transmitted without separate timing control during rank switching in a multi-rank structured memory system. Accordingly, a matched multi-rank memory system capable of being easily controlled by the memory controller 1100 and having high performance can be provided.

Figure 2:
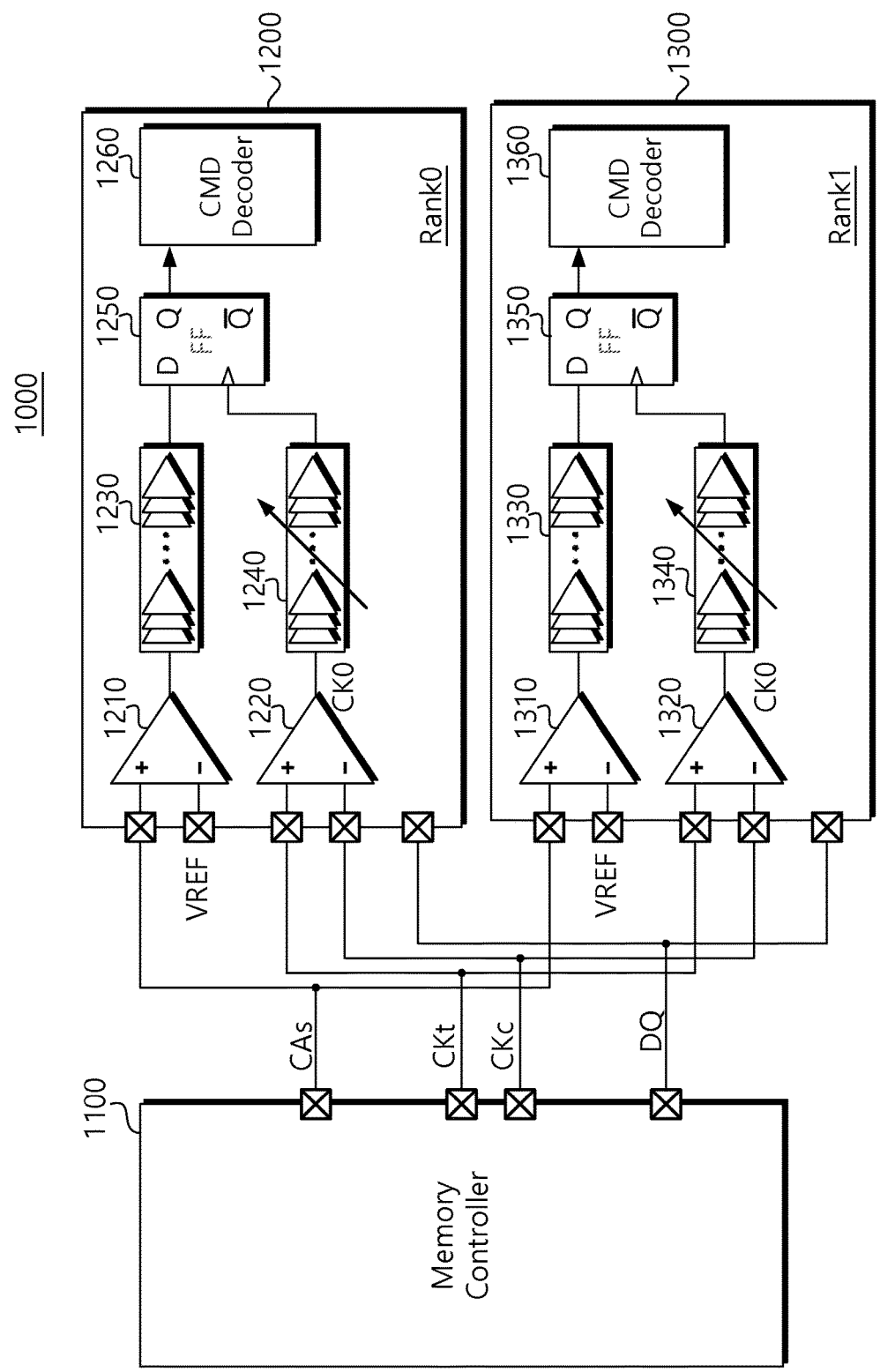
FIG. 2 is a block diagram showing the memory system of FIG. 1 in detail.

FIG. 2 is a block diagram showing the memory system of FIG. 1 in detail. Referring to FIG. 2, a memory system 1000 includes a memory controller 1100 and memory devices 1200 and 1300. For example, the memory module 1500 of FIG. 1 includes a first memory device 1200 and a second memory device 1300. For example, the first memory device 1200 constitutes a first rank Rank0 and the second memory device 1300 constitutes a second rank Rank1.

The memory controller 1100 controls the first memory device 1200 and the second memory device 1300 in a multi-rank manner. That is, the memory controller 1100 commonly applies a command/address signal CA and clock signals CKt and CKc to the first memory device 1200 and the second memory device 1300. As described in FIG. 1, the first memory device 1200 and the second memory device 1300 are connected to share a command/address signal CA and clock signals CKt and CKc through pads connected in parallel. According to an embodiment, the first memory device 1200 may include a variable delay line 1240 and the second memory device may include a variable delay line 1340. Also, the memory controller 1100 may set the variable delay line 1240 or 1340 through command bus training CBT.

Using the CBT function, the memory controller 1100 can remove or reduce skew caused by differences in characteristics of the command/address signal CA or the clock signals CKt and CKc between ranks.

The first memory device 1200 and the second memory device 1300 may be configured in the illustrated dual rank form. However, the number of memory devices may be increased to configure a 4-rank form or higher ranks of multiple channels. Each of the first memory device 1200 and the second memory device 1300 receives a common command/address signal CA and clock signals CKt and CKc from the memory controller 1100. Also, each of the first memory device 1200 and the second memory device 1300 uses a matched type command/address signal CA and clock signals CKt and CKc reception method. That is, each of the first memory device 1200 and the second memory device is provided in a form in which delays of the reception path of the command/address signal CA and the reception path of the clock signals CKt and CKc are matched.

However, the first memory device 1200 and the second memory device 1300 according to an embodiment may include delay lines for the command/address signal CA and the clock signals CKt and CKc. For example, the first memory device 1200 may include a delay line 1230 corresponding to the command/address signal CA, and a delay line 1240 corresponding to the clock signals CKt and CKc. Moreover, the second memory device 1300 may include a delay line 1330 corresponding to the command/address signal CA, and a delay line 1340 corresponding to the clock signals CKt and CKc 1340. The memory controller 1100 may perform command bus training CBT on each of the first memory device 1200 and the second memory device 1300. Also, the margin of the command/address signal CA of each of the first memory device 1200 and the second memory device 1300 may be checked based on a result of the command bus training CBT. Also, the delay lines of the clock signals CKt and CKc may be adjusted to match the timing of the command/address signal CA based on the margin of the command/address signal CA of each of the memory devices 1200 and 1300. To this end, the variable delay lines 1240 and 1340 of the clock signals CKt and CKc may be set using a fuse or a mode register set MRS.

The first memory device 1200 receives the command/address signal CA transmitted from the memory controller 1100 using the first comparator 1210. That is, the first comparator 1210 compares the received command/address signal CA with the reference voltage VREF and performs sampling. The command/address signal CA sampled by the first comparator 1210 may be transferred to the data input terminal D of the first flip-flop 1250 via the first delay line 1230.

The clock signals CKt and CKc transmitted from the memory controller 1100 are received by the second comparator 1220. The second comparator 1220 converts the clock signals CKt and CKc transmitted in the form of differential signals into an internal clock signal CK0 in the form of CMOS. That is, the second comparator 1220 will receive the clock signals CKt and CKc as a function of a Current Mode Logic to CMOS (CML to CMOS: hereinafter referred to as C2C) converter. The internal clock signal CK0 converted to a CMOS level by the second comparator 1220 is transmitted to the clock input terminal of the first flip-flop 1250 via the variable delay line 1240. The command/address signal CA is sampled in synchronization with the internal clock signal CK0 provided from the variable delay line 1240 by the first flip-flop 1250. The sampled command/address signal CA is transmitted to the first command decoder 1260 or an address decoder.

The internal clock signal CK0 output from the second comparator 1220 is transferred to the first flip-flop 1250 via the first variable delay line 1240. The delay of the first variable delay line 1240 can be controlled in various ways. That is, the first variable delay line 1240 may be set using a fuse program or a mode register set MRS. A skew of the command/address signal CA between ranks may be compensated for by setting the first variable delay line 1240.

The second memory device 1300 constituting the second rank Rank1 also includes substantially the same configuration as the first memory device 1200. That is, the second memory device 1300 includes a third comparator 1310, a fourth comparator 1320, a second delay line 1330, a second variable delay line 1340, a second flip-flop 1350, and a second command decoder 1360. Accordingly, a description of functions of components of the second memory device 1300 will be omitted.

However, command bus training CBT is performed for each of the first memory device 1200 and the second memory device 1300 or the ranks Rank0 and Rank1. In addition, adjustment of the variable delay lines 1240 and 1340 to adjust the skew of the command/address signal CA between ranks based on the result of the command bus training CBT is performed only one device among the memory devices 1200 and 1300.

The memory system 1000 includes multi-rank memory devices 1200 and 1300 that receive a command/address signal CA and clock signals CKt and CKc in a matched type. And, the skew of the command/address signal CA or the clock signals CKt and CKc existing between these memory devices 1200 and 1300 is controlled by adjusting one of the variable delay lines 1230 or 1340. Through such training, each of the matched type multi-ranks can receive the command/address signal CA at optimal clock timing.

Figure 3:
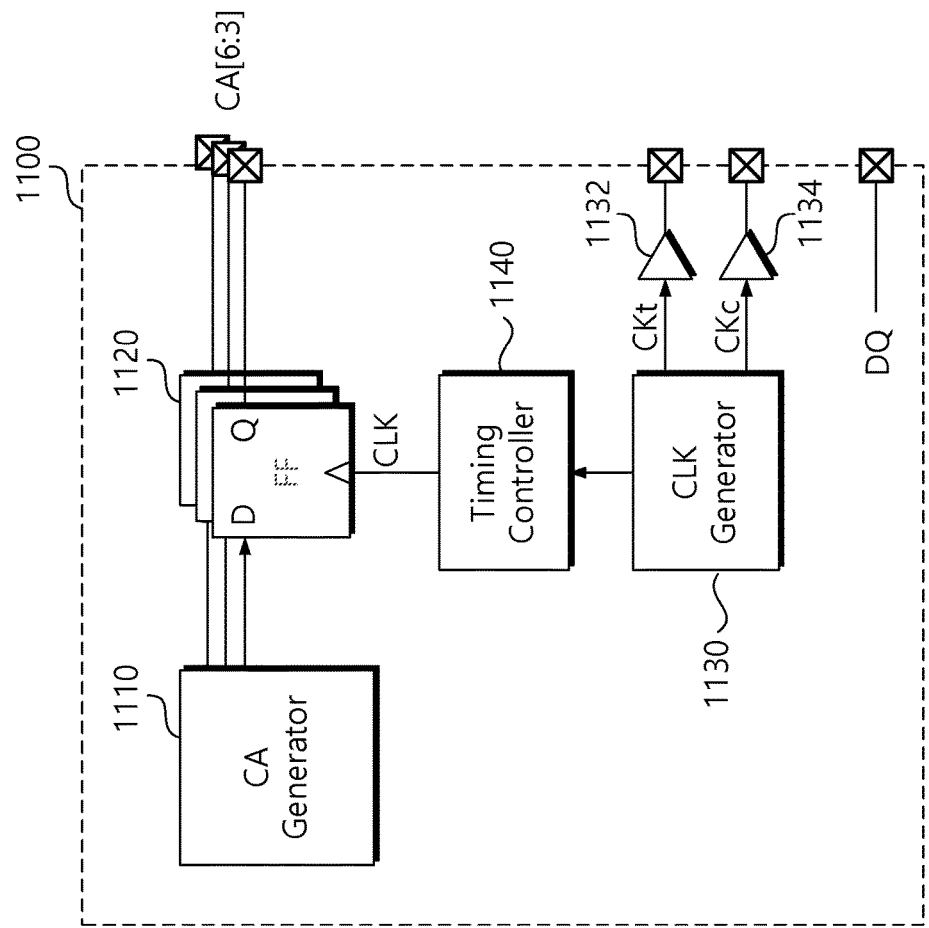
FIG. 3 is a block diagram showing a simplified structure of the memory controller of FIG. 2.

FIG. 3 is a block diagram showing a simplified structure of the memory controller of FIG. 2. Referring to FIG. 3, the memory controller 1100 may include a command/address (CA) generator 1110, a flip-flop (FF) 1120, a clock (CLK) generator 1130, clock drivers (CKt) 1132 and (CKc) 1134, and a timing controller 1140. The memory controller 1100 may further include data operation logics such as a system on a chip SoC or a processor, but illustration and description thereof will be omitted for brevity of description.

The command/address generator 1110 generates commands and addresses for writing data to the memory devices 1200 and 1300 or reading data stored in the memory devices 1200 and 1300. For example, the command/address generator 1110 may generate a read command or a write command to access the memory device 1200. And the command/address generator 1110 will also generate an address for reading or writing.

The flip-flop 1120 captures and outputs the command/address signal CA in synchronization with the clock signal CLK provided from the timing controller 1140. For example, a 4-bit wide command/address signal CA[6:3] may be output by the flip-flop 1120.

The clock generator 1130 generates clock signals CKt and CKc of designated frequencies. The clock generator 1130 may generate clock signals CKt and CKc for transmission of the command/address signal CA by using the reference clock generated by the oscillation circuit. In addition, the clock generator 1130 may generate clock signals WCKt and WCKc for transmitting or receiving the data signal DQ. The clock generator 1130 may be implemented as a phase locked loop PLL circuit or a delay locked loop DLL circuit, but is not limited thereto. Clock signals CKt and CKc from the clock generator 1130 are commonly transferred to the memory devices 1200 and 1300 through the clock drivers 1132 and 1134.

The timing controller 1140 synchronizes the clock signals CKt and CKc generated by the clock generator 1130 and the command/address signal CA. The timing to capture the command/address signal CA may be adjusted using the clock signals CKt and CKc by the timing controller 1140. That is, the transmission-side alignment of the command/address signal CA and the clock signals CKt and CKc may be performed by the timing controller 1140.

The configuration of the memory controller 1100 that transmits the common command/address signal CA and the clock signals CKt and CKc to the memory devices 1200 and 1300 constituting the multi-rank has been briefly described. From the viewpoint of the memory controller 1100, it is burdensome to separate the clock signals CKt and CKc for each rank in order to compensate for the inter-rank skew of the command/address signal CA. Accordingly, the signal integrity SI of the command/address signal CA can be increased without burden on the memory controller 1100 by using command bus training CBT for the matched type memory devices 1200 and 1300 according to an embodiment of the disclosure.

Figure 4:
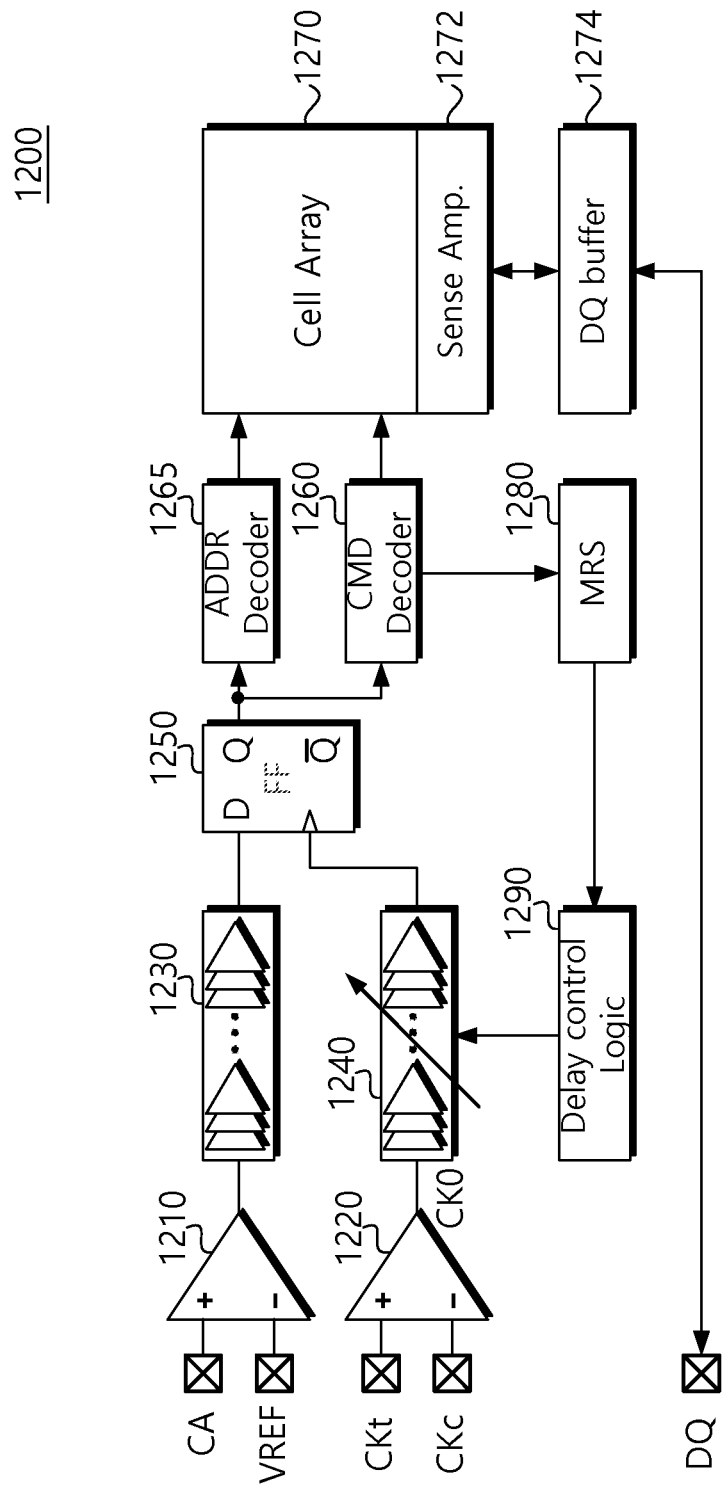
FIG. 4 is a block diagram briefly showing the configuration of the memory device of FIG. 2.

FIG. 4 is a block diagram showing the configuration of the memory device of FIG. 2 as an example. Referring to FIG. 4, the advantages of the example embodiments of the disclosure will be described using a configuration of a first memory device 1200 corresponding to a first rank Rank0 among memory devices constituting a dual-rank as an example. Although, the configuration of the first memory device 1200 is illustrated in FIG. 4, the second memory device 1300 may have a same or similar configuration as illustrated in FIG. 4. The first memory device 1200 includes comparators 1210 and 1220, a first delay line 1230, a first variable delay line 1240, a first flip-flop 1250, a first command decoder 1260, a first address decoder 1265, a first cell array 1270, a sense amplifier 1272, a data buffer 1274, a mode register set 1280, and a delay control logic 1290.

The first comparator 1210 receives the command/address signal CA transmitted from the memory controller 1100. The first comparator 1210 compares the command/address signal CA and the reference voltage VREF to determine the signal level. The determined signal level is passed to the first delay line 1230 as a sampled command/address signal CA.

The second comparator 1220 receives the clock signals CKt and CKc transmitted in the form of differential signals. The clock signals CKt and CKc transmitted from the memory controller 1100 may be converted into a CMOS internal clock signal CK0 by the second comparator 1220. That is, the second comparator 1220 receives the clock signals CKt and CKc by using the function of a Common mode-to-CMOS converter. The internal clock signal CK0 sampled by the second comparator 1220 and converted to a CMOS level is transferred to the first variable delay line 1240.

The first delay line 1230 and the first variable delay line 1240 provide matched delays between the command/address signal CA and the clock signals CKt and CKc, respectively. That is, the first delay line 1230 and the first variable delay line 1240 may be produced with an optimum matched delay value fixed. However, a change in delay characteristics may occur due to wire connections used to configure the multi-rank or conductive lines of a printed circuit board PCB. The first variable delay line 1240 may be configured as a variable delay line so as to be able to control the amount of delay.

The first flip-flop 1250 latches the data of the input terminal D based on the edge of the internal clock signal CK0 transmitted through the first variable delay line 1240 and transfers the data to the output terminal Q. For example, the first flip-flop 1250 latches the data of the input terminal D in response to the edge of the internal clock signal CK0 transmitted through the first variable delay line 1240 and transfers the data to the output terminal Q. A command/address signal CA transmitted through the first delay line 1230 is provided to the input terminal D of the first flip-flop 1250. The command/address signal CA sampled by the first flip-flop 1250 is transmitted to the command (CMD) decoder 1260 or the address (ADDR) decoder 1265.

The command decoder 1260 determines an input command by referring to the sampled command/address signal CA. The command decoder 1260 may execute a control operation for writing data into the cell array 1270 or reading data written in the cell array 1270 in response to a command provided from the outside. Also, the command decoder 1260 may write data into the mode register set 1280 according to an externally provided command and address. An address and other control signals provided through the command/address signal CA may be transferred to the address decoder 1265 in the same manner. Then, the address decoder 1265 will extract the address and information signals through a decoding operation and deliver them to necessary components.

Write data transmitted through the data bus DQ is stored in the cell array 1270. Data stored in the cell array 1270 may be sensed through the sense amplifier 1272 and output to the outside through the data buffer 1274.

The mode register set (MRS) 1280 sets an internal mode register based on an MRS command and address for designating an operation mode of the memory device 1200. The mode register set (MRS) 1280 sets the internal mode register in response to the MRS command and address. In particular, the mode register set 1280 can write and execute commands for command bus training CBT. Further, according to a request provided from the memory controller 1100 after command bus training CBT, the mode register set 1280 may adjust the delay size of the first variable delay line 1240 composed of variable delay lines. To this end, the mode register set 1280 may control the delay control logic 1290.

The delay control logic 1290 may increase or decrease the delay of the first variable delay line 1240 according to information provided through the mode register set 1280. For example, the delay control logic 1290 may select a delay size of the first variable delay line 1240 according to the control of the mode register set 1280. Implementations of the delay control logic 1290 may be provided in a variety of ways. That is, the delay control logic 1290 may be implemented with a fuse option or control logic.

According to the first memory device 1200 described above, the delay of the internal clock CK0 generated from the received clock signals CKt and CKc may be adjusted. A skew of the command/address signal CA between ranks may be detected through command bus training CBT. By adjusting the delay of the internal clock CK0 of any one of the memory devices, signal integrity SI of the command/address signal CA of the multi-rank memory module 1500 (see FIG. 1) may be secured.

Figure 5:
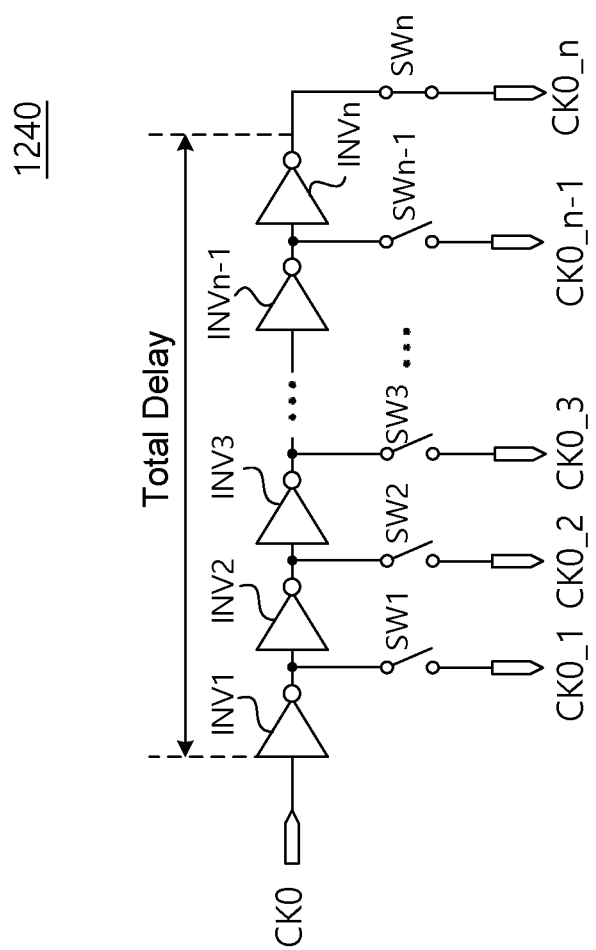
FIG. 5 is a schematic circuit diagram showing an exemplary structure of the clock delay line of FIG. 4.

FIG. 5 is a schematic circuit diagram showing an exemplary structure of the clock delay line of FIG. 4. Referring to FIG. 5, the first variable delay line 1240 uses a plurality of inverters INV1 to INVn as delay elements. That is, the first variable delay line 1240 may use one of the outputs Out_1 to Out_n of each of the plurality of inverters INV1 to INVn as the delayed output CK0_j of the internal clock CK0. The output selected by the switch control signal (e.g., SWn) is determined as the value of the adjusted delay output CK0_j. That is, a selected one (e.g., CK0_3) of the plurality of outputs CK0_1 to CK0_n may be used as a clock signal for capturing the command/address signal CA. Any one selected from among the plurality of outputs CK0_1 to CK0_n may be transmitted to the first flip-flop 1250 by the selected switches SW1 to SWn.

In the above, the configuration using inverters and switches for the first variable delay line 1240 has been briefly described, but the disclosure is not limited thereto. For example, the first variable delay line 1240 may use a plurality of flip-flops FF1 to FFn as delay elements. In addition, the second variable delay line 1340 included in the second memory device 1300 configuring the multi-rank may also have substantially the same configuration as the first variable delay line 1240.

Figure 6:
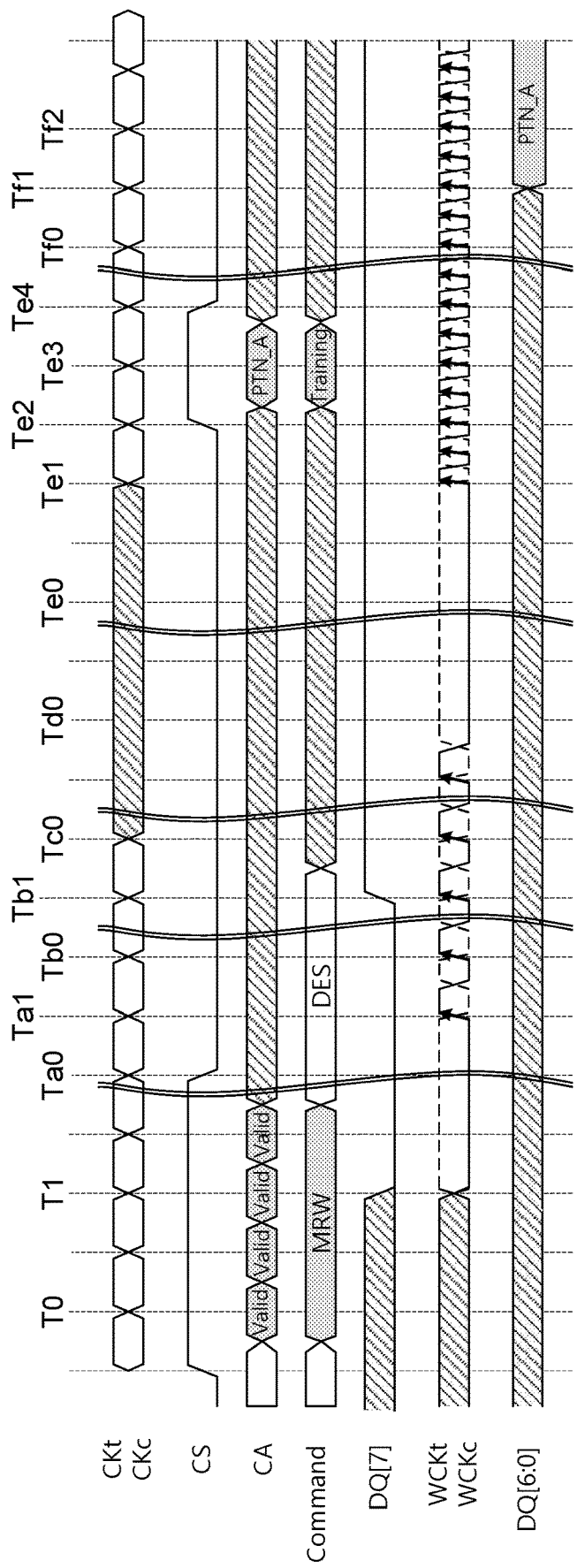
FIG. 6 is a timing diagram exemplarily illustrating a command bus training (CBT) method according to an embodiment.

FIG. 6 is a timing diagram exemplarily illustrating a command bus training CBT method according to an embodiment. Referring to FIG. 6, waveforms of signals exchanged between the memory controller 1100 and the memory device 1200 or 1300 during command bus training CBT are illustrated as an example. Hereinafter, command bus training CBT will be described using waveforms of signals exchanged between the memory controller 1100 and the memory device 1200 as an example.

When the chip select signal CS transitions to a high level, the first memory device 1200 is selected. Then, the clock signals CKt and CKc for transmitting the command/address signal CA start toggling. Then, it may indicate that the chip select signal CS activated before the point of time T0 and the command/address signal CA[6:0] transmitted through the command/address bus are the mode register setting command MRW. Then, the first memory device 1200 receives the mode register setting command MRW synchronized with the rising or falling edges of the clock signals CKt and CKc. The first memory device 1200 may set the received command bus training CBT mode in the mode register set 1280.

At the time of Ta1, toggling of the data clock signals WCKt and WCKc starts. At the time Tb1, the data signal DQ[7] transitions to logic high in synchronization with the rising edge of the data clock signal WCKt. Then, the memory device 1200 may enter a command bus training CBT mode.

Here, the data signal DQ[7] is a signal excluded from a one-to-one matching relationship with the command/address signal CA[6:0] among the data signals DQ[7:0] in the command bus training CBT mode. In the command bus training CBT mode, each of the command/address signals CA[6:0] corresponds to each of the data signals DQ[6:0] and is output as a command bus training CBT signal. However, the data signal DQ[7] is not used to be output as a command bus training CBT signal. That is, the data signal DQ[7] not used for the command bus training CBT mode output signal may be used as a signal instructing entry into the command bus training CBT mode.

At the time of Te2, the chip select signal CS transitions to logic high. Then, the memory controller 1100 inputs a training pattern PTN_A for checking a margin of a unit interval (hereinafter referred to as UI) of the command/address signal CA of the first memory device 1200. At this time, the training pattern PTN_A is input in synchronization with the clock signals CKt and CKc.

At the time point Tf0, the data signal DQ[6:0] according to the alignment characteristics of the input training pattern PTN_A and the clock signals CKt and CKc is output. At this time, whether the data signal DQ[6:0] passes or fails is determined according to the degree of alignment between the input training pattern PTN_A and the clock signals CKt and CKc. The memory controller 1100 compares the training pattern PTN_A output as the data signal DQ[6:0] with the bit value of the input training pattern to determine Pass or Fail. The memory controller 1100 compares the input bit value and the output bit value of the training pattern PTN_A, and judges it as Pass if they are the same. On the other hand, the memory controller 1100 determines that it is Fail when the input bit value and the output bit value of the training pattern PTN_A are different.

For the command bus training CBT, input and output of the above-described training pattern PTN_A may be performed multiple times while varying the timing of the training pattern PTN_A. In another embodiment, the input and output of the training pattern PTN_A for the command bus training CBT may be implemented multiple times while varying the delays of the clock signals CKt and CKc. When the command bus training CBT for the first memory device 1200 is completed, the memory controller 1100 will continue the command bus training CBT according to the procedure described in the timing diagram for the second memory device 1300.

Figure 7:
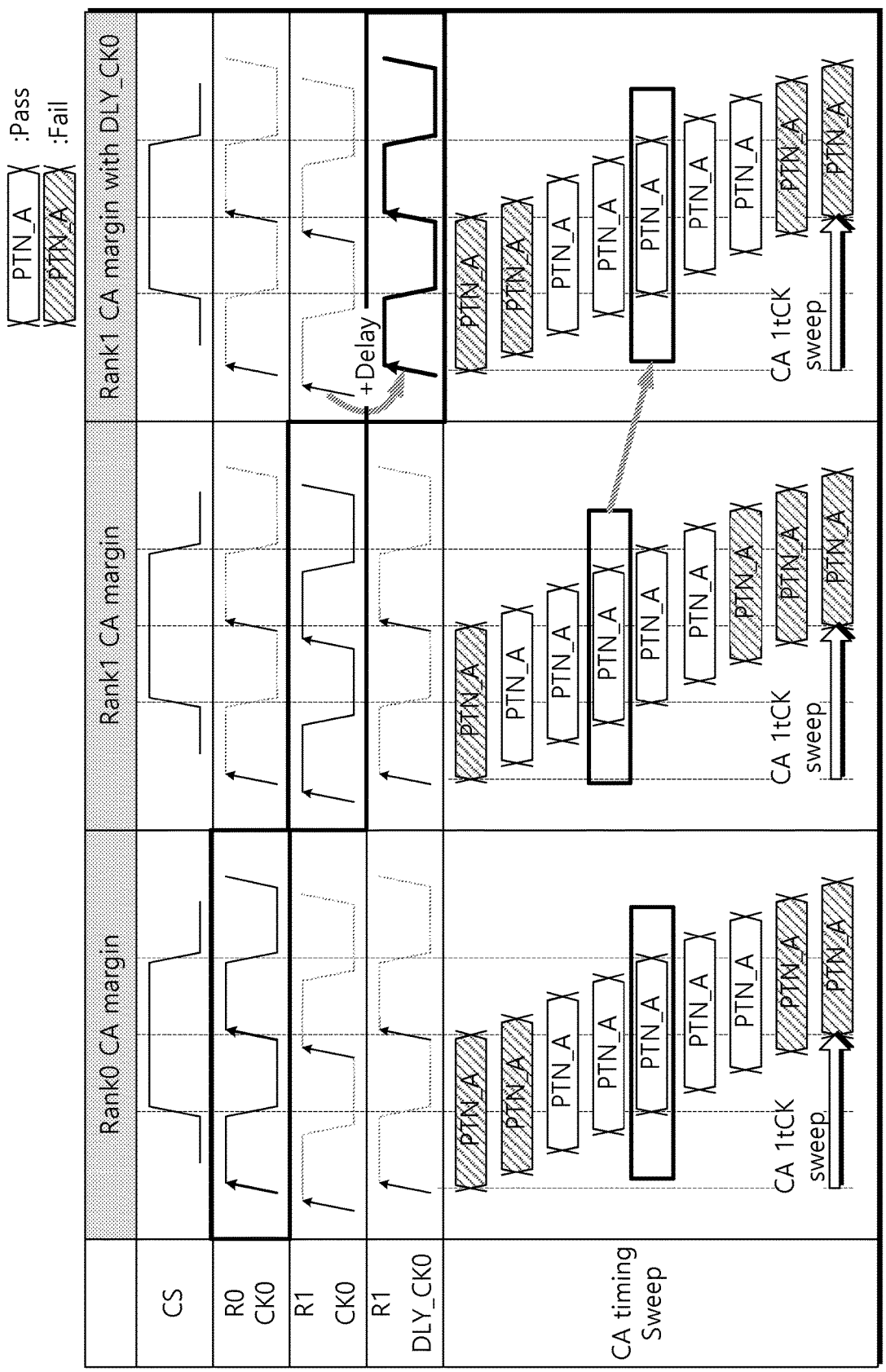
FIG. 7 is a diagram showing results of command bus training CBT for multi-rank memory devices.

FIG. 7 is a diagram showing the results of command bus training CBT for the multi-rank memory. Referring to FIG. 7, a relative position or margin of a training pattern PTN_A for each rank output for the chip select signal CS according to a result of command bus training CBT is shown. Here, since the first memory device 1200 constitutes the first rank Rank0 and the second memory device 1300 constitutes the second rank Rank1, the first rank Rank0 may refer to the first memory device 1200 and the second rank Rank1 may refer to the second memory device 1300.

The results of the command bus training CBT for the first rank Rank0 are shown in the second column of the table. The characteristics of the command/address signal CA of the first rank Rank0 are well aligned with the internal clock signal CK0. Accordingly, the pass training patterns PTN_A output as a result of the CA sweep in the first rank Rank0 are distributed in a balanced manner with respect to the center of the chip select signal CS. Here, CA sweep refers to a training operation for determining an optimal input timing of a command bus. For the CA sweep, the memory controller 1100 (refer to FIG. 1) may input and receive output while varying the input timing of the training pattern PTN_A input to the command bus a plurality of times. That is, the procedure of inputting and outputting the training pattern PTN_A of FIG. 7 may be executed multiple times by applying different input timings. Also, the memory controller 1100 determines Pass or Fail according to whether there is an error in the output training patterns PTN_A corresponding to each input timing. The input timing of the training patterns PTN_A is implemented with delays of different sizes within one input cycle (1 tCK).

On the other hand, the results of command bus training CBT for the second rank Rank1 are shown in the third column of the table. The characteristic of the command/address signal CA of the second rank Rank1 has a skew with the internal clock signal CK0. Accordingly, the pass training patterns PTN_A output as a result of the CA sweep is distributed in a form biased with respect to the center of the chip select signal CS. That is, in order to increase the CA margin of the first rank Rank0 and the second rank Rank1, the delay of the internal clock signal (CK0) of the second rank Rank1 is required.

Considering the result of the command bus training CBT, it is necessary to delay the internal clock signal CK0 of the second rank Rank1. To this end, the memory controller 1100 may set the second variable delay line 1340 of the second memory device 1300 to increase the delay (+Delay) to a specific size. As the delay (+Delay) of the internal clock signal through the second variable delay line 1340 increases, the margin of the command/address signal CA of the second rank Rank1 may increase.

Figure 8:
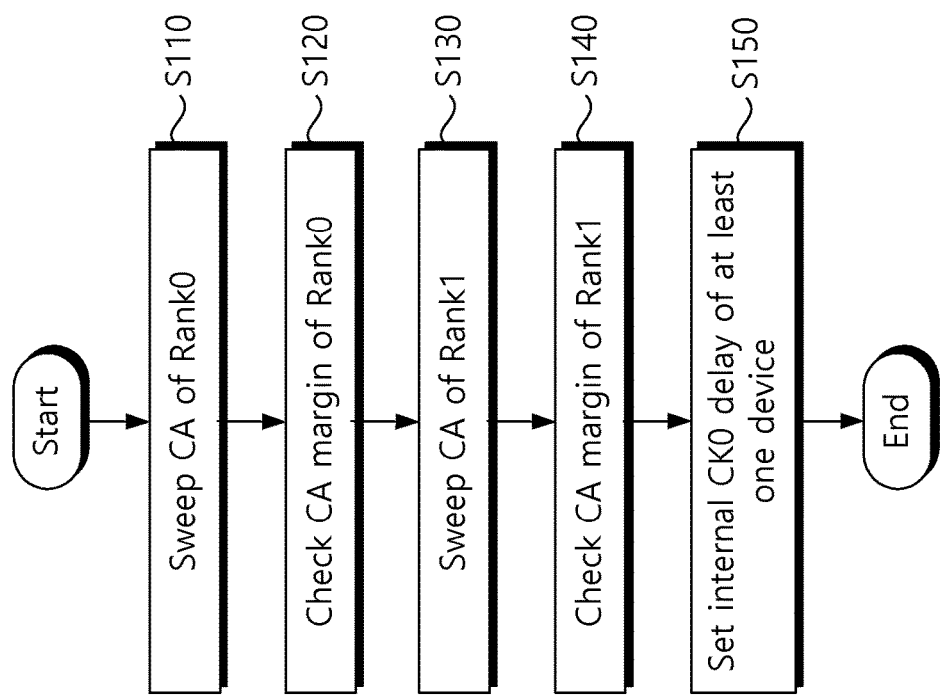
FIG. 8 is a flowchart briefly illustrating a command bus training CBT method according to an embodiment.

FIG. 8 is a flowchart briefly illustrating a command bus training CBT method according to an embodiment. Referring to FIG. 8, a command/address signal CA is swept through command bus training CBT for each rank, and a variable delay line of any one rank can be adjusted using the result.

In operation S110, the memory controller 1100 performs command bus training CBT for the first rank Rank0. That is, the memory controller 1100 changes the input timing of the training pattern PTN_A to sweep the command/address signal CA. In another embodiment, the input timing of the training pattern PTN_A may be fixed and the command/address signal CA may be swept while changing the timing of the clock signals CKt and CKc.

In operation S120, the memory controller 1100 checks the margin of the command/address signal CA with respect to the first rank Rank0. That is, the memory controller 1100 may check the margin of the command/address signal CA by comparing the input training pattern PTN_A with the output training pattern PTN_A.

In operation S130, the memory controller 1100 performs command bus training CBT for the second rank Rank1. That is, the memory controller 1100 performs a sweep of the command/address signal CA while varying the input timing of the training pattern PTN_A. Alternatively, the command/address signal CA may be swept while the input timing of the training pattern PTN_A is fixed and the timings of the clock signals CKt and CKc are changed.

In operation S140, the memory controller 1100 checks the margin of the command/address signal CA for the second rank Rank1. That is, the memory controller 1100 may check the margin of the command/address signal CA by comparing the training pattern PTN_A input to the second rank Rank1 with the output training pattern PTN_A.

In operation S150, the memory controller 1100 compares the command/address signal CA margin of the first rank Rank0 with the command/address signal CA margin of the second rank Rank1. Also, the memory controller 1100 adjusts at least one clock delay line 1240 of the first rank Rank0 and the second rank Rank1 according to the comparison result.

Figure 9:
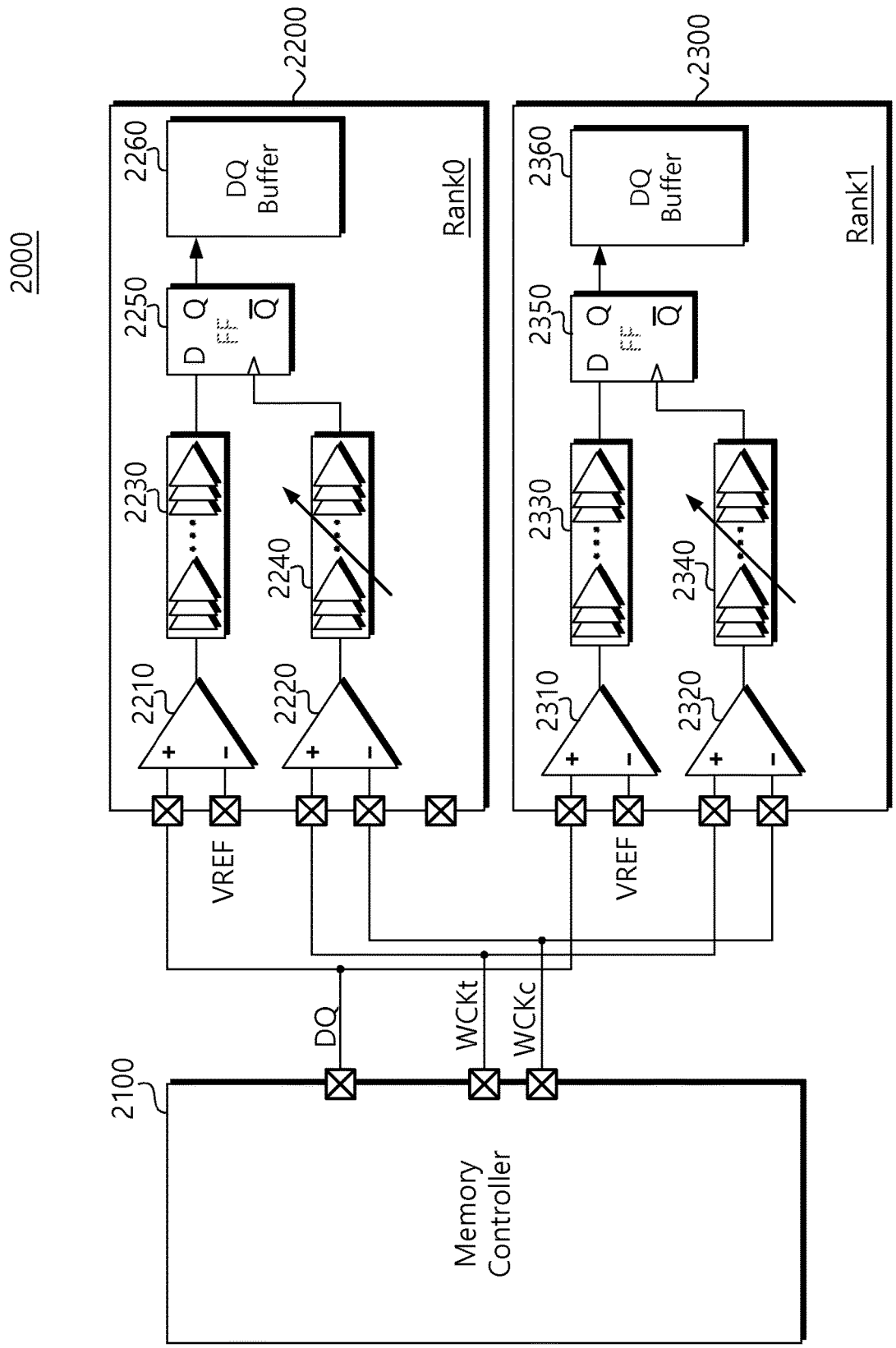
FIG. 9 is a schematic block diagram of a memory system according to another exemplary embodiment.

FIG. 9 is a schematic block diagram of a memory system according to another example embodiment. Referring to FIG. 9, a memory system 2000 includes a memory controller 2100 and memory devices 2200 and 2300. Each of the memory devices 2200 and 2300 may configure a memory module implemented in a multi-rank. That is, the memory devices 2200 and 2300 constitute two ranks Rank0 and Rank1, respectively. Unlike the memory system 1000 of FIG. 2, the memory system 2000 shares data signals DQ and data clock signals WCKt and WCKc. Accordingly, the memory devices 2200 and 2300 may include variable delay lines 2240 and 2340 capable of internally delaying the data clock signals WCKt and WCKc.

The memory controller 2100 controls the memory devices 2200 and 2300 in a multi-rank manner. That is, the memory controller 1100 commonly applies the data signal DQ and the data clock signals WCKt and WCKc to the memory devices 2200 and 2300. The memory devices 2200 and 2300 may be wired to share the data signal DQ and the data clock signals WCKt and WCKc through pads connected in parallel. Also, the memory controller 2100 may set the variable delay line 2240 or 2340 provided inside the memory devices 2200 and 2300 through data bus training. Using this function, the memory controller 2100 can compensate for skew caused by differences in characteristics of the data signal DQ or the data clock signals WCKt and WCKc between ranks.

The memory devices 2200 and 2300 may be configured in the illustrated dual rank form. However, the number of memory devices 2200 and 2300 may be increased to configure 4-rank or higher ranks of multiple channels. Each of the memory devices 2200 and 2300 receives a common command/address signal CA and clock signals CKt and CKc from the memory controller 2100. Also, each of the memory devices 2200 and 2300 uses a method of receiving a matched type data signal DQ and data clock signals WCKt and WCKc.

However, the memory devices 2200 and 2300 may include variable delay lines 2240 and 2340 of data clock signals WCKt and WCKc. The memory controller 2100 may perform data bus training for each of the memory devices 2200 and 2300. Also, the margin of the data signal DQ of each of the memory devices 2200 and 2300 may be checked based on a result of data bus training. Also, the variable delay lines of the data clock signals WCKt and WCKc may be adjusted based on the margin of the data signal DQ of each of the memory devices 2200 and 2300. To this end, the variable delay lines 2240 and 2340 of the data clock signals WCKt and WCKc may be set using fuses or mode register sets.

The first memory device 2200 receives the data signal DQ transmitted from the memory controller 2100 using the first comparator 2210. That is, the first comparator 2210 compares the received data signal DQ with the reference voltage VREF and performs sampling. The data signal DQ sampled by the first comparator 2210 is transferred to the data input terminal D of the first flip-flop 2250 via the first data delay line 2230.

The data clock signals WCKt and WCKc transmitted from the memory controller 2100 are received by the second comparator 2220. The second comparator 2220 converts the data clock signals WCKt and WCKc transmitted in the form of differential signals into signals in the form of CMOS. That is, the second comparator 2220 will receive the data clock signals WCKt and WCKc as a function of a common mode-to-CMOS (C2C) converter. It is converted to a CMOS level by the second comparator 2220 and transmitted to the clock input terminal of the first flip-flop 2250 via the first variable delay line 2240. The data signal DQ is sampled in synchronization with the data clock signals WCKt and WCKc by the first flip-flop 2250. The sampled data signal DQ is transferred to the first data buffer 2260.

The data clock signals WCKt and WCKc received by the second comparator 2220 are transferred to the first flip-flop 2250 via the first variable delay line 2240. The first variable delay line 2240 may be provided in a structure capable of controlling a delay size through various means. That is, the first variable delay line 2240 may be set using a fuse program or a mode register set MRS. The first variable delay line 2240 or the second variable delay line 2340 is set to adjust the size of the delay of the data clock signals WCKt and WCKc to determine the skew of the data signal DQ between ranks.

The second memory device 2300 constituting the second rank Rank1 also includes substantially the same configuration as the first memory device 2200. That is, the second memory device 2300 may include a third comparator 2310, a fourth comparator 2320, a second data delay line 2330, a second variable delay line 2340, a second flip-flop 2350, and a second data buffer 2360. Accordingly, a description of functions of components of the second memory device 2300 will be skipped.

However, data bus training is performed for each of the memory devices 2200 and 2300. In addition, the delay adjustment of the data clock signals WCKt and WCKc in order to adjust the skew of the data signal DQ between ranks based on the result of data bus training is performed only on one of the memory devices 2200 and 2300.

The memory system 2000 may include multi-rank memory devices 2200 and 2300 that receive data signals DQ and data clock signals WCKt and WCKc in a matched type. Also, the skew of the data signal DQ existing between the memory devices 2200 and 2300 may be compensated for by adjusting the variable delay line 2230 or 2340 provided inside one of them. Through such training, each of the multi-ranks of the matched type can receive the data signal DQ at optimal clock timing.

Figure 10:
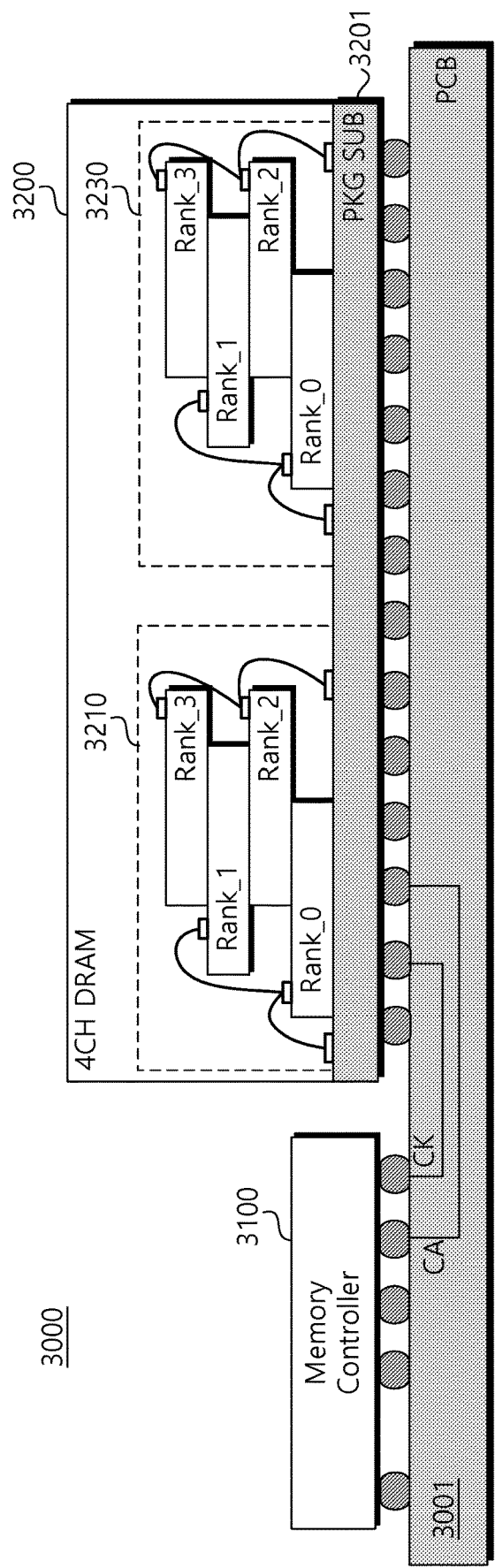
FIG. 10 is a cross-sectional view showing the configuration of a memory system according to another embodiment.

FIG. 10 is a cross-sectional view showing the configuration of a memory system according to another embodiment of the disclosure. Referring to FIG. 10, a memory system 3000 includes a memory controller 3100 and a memory module 3200. The memory module 3200 includes a plurality of multilayer memory devices 3210 and 3230, each constituting four ranks respectively.

The memory controller 3100 may perform an access operation of writing data to the memory module 3200 or reading data stored in the memory module 3200. The memory controller 3100 may generate a command CMD and an address ADDR for writing data into the memory module 3200 or reading data stored in the memory module 3200. The memory controller 3100 may be at least one of a chipset for controlling the memory module 3200, a system-on-a-chip SoC such as a mobile application processor AP, a CPU, and a GPU.

The memory module 3200 includes a plurality of stacked memory devices corresponding to multi-ranks Rank0, Rank1, Rank2, and Rank3. The stacked four memory devices 3210 may share a command/address signal CA and clock signals CKt and CKc, respectively, in a two-rank structure. Each of the stacked four memory devices 3210 may be connected to the memory controller 3100 in a structure in which two ranks constitute one channel. That is, the first rank Rank0 and the second rank Rank1 of the memory devices 3210 may be connected by wire bonding to share the command/address signal CA and the clock signals CKt and CKc. Also, the third rank Rank2 and the fourth rank Rank3 may be connected by wire bonding to share the command/address signal CA and the clock signals CKt and CKc. The memory devices 3230 may also be connected to the memory controller 3100 in the same rank structure as the memory devices 3210.

The memory devices 3210 may adjust delays of the internal clock signals CKt and CKc through command bus training CBT in the manner described above. To this end, each of the memory devices 3210 may include a variable delay line for setting a delay of the internal clock signal CK0.

Figure 11:
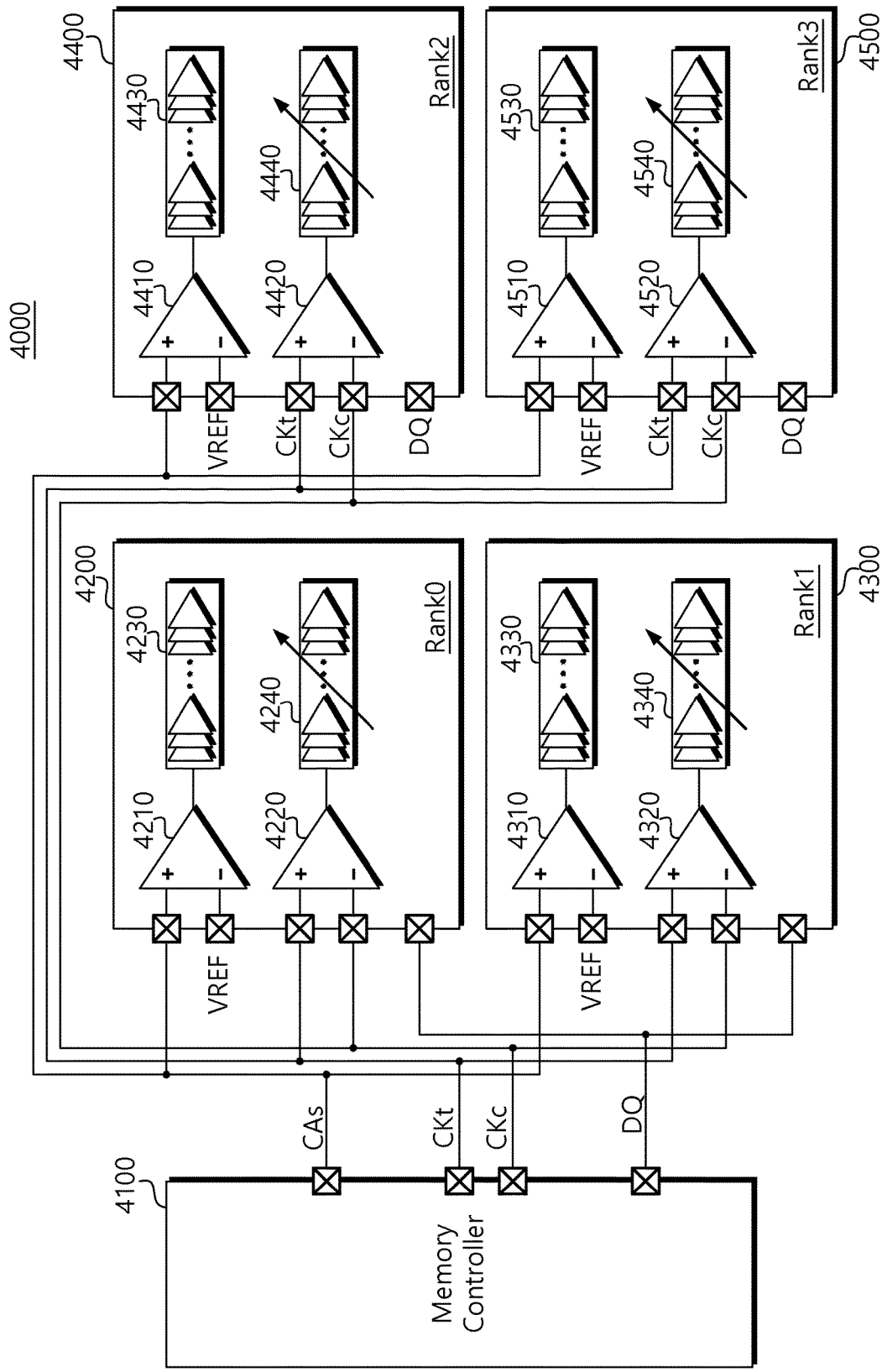
FIG. 11 is a block diagram illustrating a memory system according to another exemplary embodiment.

FIG. 11 is a block diagram illustrating a memory system according to another exemplary embodiment. Referring to FIG. 11, a memory system 4000 includes a memory controller 4100 and memory devices 4200, 4300, 4400, and 4500. The memory devices 4200, 4300, 4400, and 4500 constitute four ranks Rank0, Rank1, Rank2, and Rank3.

The memory controller 4100 controls the memory devices 4200, 4300, 4400, and 4500 in a 4-rank manner. That is, the memory controller 4100 commonly applies a command/address signal CA bus and clock signals CKt and CKc to the memory devices 4200, 4300, 4400, and 4500. The memory devices 4200, 4300, 4400, and 4500 are connected to share command/address signals CA and clock signals CKt and CKc through pads connected in parallel. Also, the memory controller 4100 may set one or more of the variable delay lines 4240, 4340, 4440, and 4540 included in the memory devices 4200, 4300, 4400, and 4500 through command bus training CBT. Using this function, the memory controller 4100 can remove or reduce skew caused by differences in characteristics of the command/address signal CA or the clock signals CKt and CKc between ranks.

Each of the memory devices 4200, 4300, 4400, and 4500 receives a common command/address signal CA and clock signals CKt and CKc from the memory controller 4100. Also, each of the memory devices 4200, 4300, 4400, and 4500 uses a matched type command/address signal CA and clock signals CKt and CKc reception method. That is, each of the memory devices 4200, 4300, 4400, and 4500 is provided in a form in which delays of the reception path of the command/address signal CA and the reception path of the clock signals CKt and CKc are matched.

The memory devices 4200, 4300, 4400, and 4500 may include variable delay lines 4240, 4340, 4440, and 4540 capable of adjusting delays of clock signals CKt and CKc therein. The memory controller 4100 may perform command bus training CBT on each of the variable delay lines 4240, 4340, 4440, and 4540. Also, the margin of the command/address signal CA of each of the memory devices 4200, 4300, 4400, and 4500 may be checked based on a result of the command bus training CBT. In order to match the timing of the command/address signal CA based on the margin of the command/address signal CA of each of the memory devices 4200, 4300, 4400, and 4500, the delay lines of the clock signals CKt and CKc can be adjusted. To this end, at least one of the variable delay lines 4240, 4340, 4440, and 4540 may be adjusted using a fuse or mode register. A configuration of each of the memory devices 4200, 4300, 4400, and 4500 is substantially the same as that of FIG. 4 described above.

The memory system 4000 may include 4-rank memory devices 4200, 4300, 4400, and 4500 that receive a command/address signal CA and clock signals CKt and CKc in a matched type. In addition, the skew of the command/address signal CA or the clock signals CKt and CKc existing between the memory devices 4200, 4300, 4400, and 4500 may be compensated by adjusting at least one of the variable delay lines 4240, 4340, 4440, 4540. Through such training, each of the multi-ranks of the matched type can receive the command/address signal CA at optimal clock timing.

Figure 12:
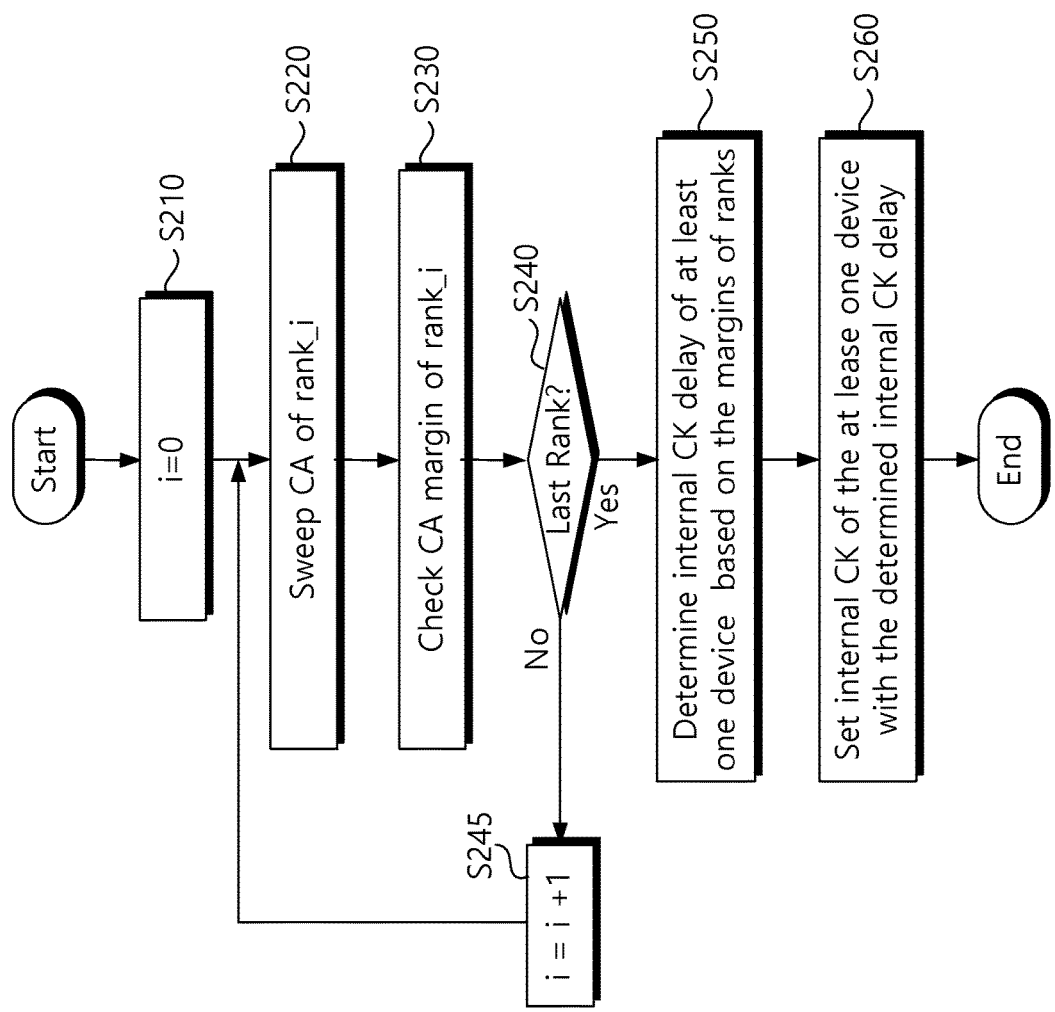
FIG. 12 is a flowchart briefly illustrating a command bus training CBT method of a multi-rank memory system according to an embodiment.

FIG. 12 is a flowchart briefly illustrating a command bus training CBT method of a multi-rank memory system according to an embodiment. Referring to FIG. 12, a command/address signal CA is swept through command bus training CBT for each rank, and a variable delay line of at least one rank can be adjusted using the result.

In operation S210, initialization of a rank identification number T for command bus training CBT is performed. For example, the rank identification number (i, where i is an integer greater than or equal to 0) may be initialized to '0'.

In operation S220, the memory controller 4100 performs command bus training CBT for the first rank Rank0. That is, the memory controller 4100 performs a sweep of the command/address signal CA by changing the input timing of the training pattern PTN_A. In another embodiment, the input timing of the training pattern PTN_A may be fixed and the command/address signal CA may be swept while changing the timing of the clock signals CKt and CKc.

In operation S230, the memory controller 4100 checks the margin of the command/address signal CA for the first rank Rank0 from the result of the command bus training CBT performed in operation S220. That is, the memory controller 4100 may check the margin of the command/address signal CA by comparing the input training pattern PTN_A with the output training pattern PTN_A.

In operation S240, the memory controller 4100 checks whether the command bus training CBT performed in the previous operation corresponds to the last rank. If the rank to which operations S220 and S230 are applied corresponds to the last rank (Yes direction), the procedure moves to operation S250. On the other hand, if the rank to which operations S220 and S230 are applied does not correspond to the last rank (No direction), the procedure moves to operation S245. In operation S245, the rank identification number 'i' is increased. Then, the process returns to operation S220 and command bus training CBT for the next rank will continue.

In operation S250, the memory controller 4100 determines the adjustment size of the clock signals CKt and CKc by referring to the result of the command bus training CBT for each of the plurality of ranks. For example, the memory controller 4100 may determine an adjustment size of one or more of the variable delay lines 4240, 4340, 4440, and 4540.

In operation S260, the memory controller 4100 adjusts one or more of the variable delay lines 4240, 4340, 4440, and 4540 to the delay size determined in operation S250. To adjust the delay size of the variable delay lines 4240, 4340, 4440, and 4540, the memory controller 4100 may use a mode register set MRS command.

According to one or more example embodiments of the disclosure described above, a method of applying the command bus training CBT to a multi-rank system has been briefly described. When the command bus training CBT of the one or more example embodiments is applied, the skew of the command/address signal CA and the clock signals CKt and CKc of the multi-rank memory system provided in a matched type can be easily compensated. Through such training, each of the matched multi-ranks can receive the command/address signal CA at optimal clock timing.

The above are specific embodiments for carrying out the disclosure. In addition to the above-described embodiments, the disclosure may include simple design changes or easily changeable embodiments. In addition, the disclosure will include techniques that can be easily modified and implemented using the embodiments. Therefore, the scope of the disclosure should not be limited to the above-described embodiments, and should be defined by the claims and equivalents of the claims of the disclosure as well as the claims to be described later.

What is claimed is:

1. A memory module comprising:
   a first memory device; and
   a second memory device configured to share a command/address (CA) signal and a clock signal with the first memory device,
   wherein the first memory device and the second memory device receive the CA signal and the clock signal in a matched manner, and the first memory device comprises a variable adjustment circuit configured to adjust a characteristic of the received clock signal,
   wherein the first memory device comprises:
      a fixed adjustment circuit configured to adjust the CA signal with a fixed delay, and
      a variable adjustment circuit configured to adjust the clock signal with a variable delay such that a matched delay value between the CA signal and the clock signal is fixed.

2. The memory module of claim 1, wherein the clock signal corresponds to a strobe signal for latching the CA signal.

3. The memory module of claim 1, wherein the first memory device comprising:
   a flip-flop configured to latch the CA signal output from the fixed adjustment circuit based on the adjusted clock signal,
   wherein the fixed adjustment circuit is further configured to adjust a characteristic of the CA signal based on a first value, and
   wherein the variable adjustment circuit is further configured to adjust the characteristic of the clock signal based on a second value.

4. The memory module of claim 3, wherein the first memory device comprises a delay control logic configured to adjust the variable adjustment circuit.

5. The memory module of claim 4, wherein the delay control logic is controlled through a mode register set command provided from outside of the first memory device.

6. The memory module of claim 4, wherein the delay control logic comprises a fuse offset configured to set the variable adjustment circuit to the second value according to an external control of the first memory device.

7. The memory module of claim 3, wherein the second value is determined through command bus training for the first memory device and the second memory device.

8. A training method for a matched type multi-rank memory module sharing a command/address (CA) signal and a clock signal, the method comprising:
   performing first command bus training to check alignment of the CA signal and the clock signal in a first rank;
   performing second command bus training to check alignment of the CA signal and the clock signal in a second rank;
   checking, based on results of the first command bus training and the second command bus training, a first margin of the CA signal in the first rank and a second margin of the CA signal in the second rank, the first rank or the second rank including a fixed delay line and a variable delay line;
   fixedly adjust the CA signal using the fixed delay line; and
   variably adjusting, using the variable delay line, a delay of the clock signal within the first rank based on the first margin of the CA in the first rank such that a matched delay value between the CA signal and the clock signal in the first rank is fixed or the second rank based on the second margin of the CA in the second rank such that a matched delay value between the CA signal and the clock signal in the second rank is fixed.

9. The method of claim 8, wherein a characteristic of the CA signal is adjusted based on a first value, and
   wherein a characteristic of the clock signal is adjusted based on a second value.

10. The method of claim 9, further comprises adjusting the variable delay line through a mode register set command or a fuse program.

11. The method of claim 8, wherein the clock signal corresponds to a strobe signal for latching the CA signal.

12. A memory system comprising:
a memory controller configured to transmit a first signal through a first bus and a clock signal through a second bus; and
a memory module comprising a first memory rank and a second memory rank, the first memory rank and the second memory rank configured to share the first bus and the second bus,
wherein each of the first memory rank or the second memory rank comprises:
a fixed adjustment circuit configured to adjust the first signal received through the first bus with a fixed delay; and
a variable adjustment circuit configured to variably adjust the clock signal received through the second bus with a variable delay such that a matched delay value between the first signal and the clock signal is fixed.

13. The memory system of claim 12, wherein the first memory rank or the second memory rank receives the first signal and the clock signal in a matched manner.

14. The memory system of claim 12, wherein the first signal transmitted through the first bus corresponds to a command/address (CA) signal.

15. The memory system of claim 12, wherein the first signal transmitted through the first bus corresponds to a data (DQ) signal.

16. The memory system of claim 12, wherein the first memory rank comprising:
a flip-flop circuit configured to latch the first signal output from the fixed adjustment circuit based on the adjusted clock signal output from the variable adjustment circuit,
wherein the fixed adjustment circuit is further configured to adjust a characteristic of the CA signal based on a first value, and
wherein the variable adjustment circuit is further configured to adjust a characteristic of the clock signal based on a second value.

17. The memory system of claim 16, wherein the first memory rank comprises a delay control logic configured to set the second value based on a control signal.

18. The memory system of claim 17, wherein the delay control logic comprises a mode register set or a fuse option.

19. The memory system of claim 12, wherein the memory controller is further configured to perform command bus training to detect skew of the first bus of the first memory rank and the second memory rank.

20. The memory system of claim 19, wherein the memory controller is further configured to set a delay size of the variable adjustment circuit of one of the first memory rank and the second memory rank based on a result of the command bus training.

* * * * *